Patented Apr. 24, 1951

2,550,494

UNITED STATES PATENT OFFICE 2,550,494

SALTS OF 3,6 ENDOXOHEXAHYDRO-PHTHALIC ACID

John F. Olin, Grosse Ile, Mich., assignor to Sharples Chemicals Inc., a corporation of Delaware No Drawing. Application April 1, 1950, Serial No. 153,481

12 Claims. (Cl. 260—345)

This invention relates to a process for the preparation of water-soluble neutral salts of 3,6-endoxohexahydrophthalic acid. The term neutral is used to indicate that the hydrogen atom in each carboxyl group of the parent acid is replaced either by a metal cation or by a metalloid cation. 3,6-Endoxohexahydrophthalic acid and derivatives thereof may exist in any one of three isomeric forms designated as exo-cis, endo-cis, and trans by Woodward and Baer, J. Am. Chem. Soc. 70, 1161–1166. While this invention is more particularly concerned with the production of the exo-cis form of such neutral salts, it may be applied in the production of neutral salts of the other isomeric forms.

More specifically, the invention relates to a process which utilizes available, reasonably-priced catalysts and chemical intermediates for the preparation of said salts.

Still more specifically, the invention relates to a process which embodies a series of economical and commercially practicable steps to accomplish the catalytic conversion of the intermediates to substantially quantitative yields of said salts.

It is an object of the invention to make possible the low cost production of water-soluble neutral salts of 3,6-endoxohexahydrophthalic acid, either in the form of aqueous solutions or free-flowing powders as desired.

It is also an object of the invention to provide products which are useful as intermediates for further chemical processing.

For purposes of convenience, the invention will be described more particularly in connection with the exo-cis forms of the starting materials and end products.

Thus exo-cis-3,6-endoxo-1,2,3,6-tetrahydrophthalic anhydride is a particularly advantageous compound for use as a starting intermediate in the practice of the invention. This compound may be prepared by any one of several methods known to the art.

In the practice of the invention conversion of exo-cis-3,6-endoxo-1,2,3,6-tetrahydrophthalic anhydride to the desired water-soluble neutral salts of exo-cis-3,6-endoxo-hexahydrophthalic acid is accomplished through a series of reactions, each reaction being carried out under conditions appropriate for that step.

The reactions involved may be represented by a series of equations:

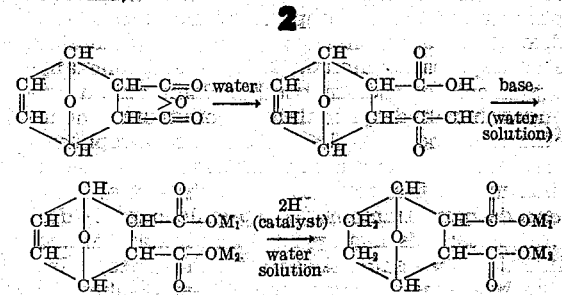

in which $M_1$ and $M_2$, taken individually, represent monovalent metal cations or metalloid cations such as those of lithium, sodium, potassium, ammonium, alkylammonium such as monoalkylammonium, dialkylammonium, or trialkylammonium, said alkylammonium cation having, for example, from 1 to 5 carbon atoms in each alkyl group, alkanolammonium such as monoalkanolammonium, dialkanolammonium, or trialkanolammonium, said alkanolammonium cation having, for example, from 2 to 3 carbon atoms in each alkanol group, and mixed alkylalkanolammonium such as monoalkyl monoalkanolammonium, dialkyl monoalkanolammonium, or monoalkyl dialkanolammonium, said mixed alkylalkanolammonium cation having, for example, from 1 to 5 carbon atoms in each alkyl group and from 2 to 3 carbon atoms in each alkanol group, and taken collectively, represent a divalent metal cation such as those of calcium, cobalt, strontium, nickel, zinc, cadmium, mercury, copper, barium, and magnesium; and in which the catalyst is chosen from the group consisting of nickel catalyst and cobalt catalyst.

The invention may also be applied to the hydrogenation of water-soluble salts of polyvalent metals such as iron and aluminum.

Specific illustrative examples of water-soluble neutral salts of exo-cis-3,6-endoxohexahydrophthalic acid which may be prepared by catalytic hydrogenation of the corresponding intermediately prepared water-soluble neutral salts of exo-cis-3,6-endoxo-1,2,3,6-tetrahydrophthalic acid are (it being understood that although the term exo-cis is omitted from the names in the list, it is that isomeric form which is meant): disodium 3,6-endoxohexahydrophthalate; dipotassium 3,6-endoxohexahydrophthalate; diammonium 3,6-endoxohexahydrophthalate; sodium potassium 3,6-endoxohexahydrophthalate; sodium ammonium 3,6-endoxohexahydrophthalate; sodium lithium 3,6-endoxohexahydrophthalate; dilithium 3,6 - endoxohexahydrophthalate; bis-(monoethylammonium) 3,6 - endoxohexahydrophthalate; diethylammonium tri-n-propylammonium 3,6-endoxohexahydrophthalate; bis(diethylammonium) 3,6 - endoxohexahydrophthalate; bis(triethylammonium) 3,6-endoxohexahydrophthalate; monomethylammonium methyl-n-propylammonium 3,6 - endoxohexahydrophthalate; mono-n-amylammonium methylethyl - n-butylammonium 3,6-endoxohexahydrophthalate; mono - n - propylammonium monoisopropylammonium 3,6-endoxohexahydrophthalate; ammonium monomethylammonium 3,6-endoxohexahydrophthalate; sodium diethylammonium 3,6-endoxohexahydrophthalate; potassium tri-n-amylammonium 3,6-endoxohexahydrophthalate; lithium monoisobutylammonium 3,6-endoxohexahydrophthalate; bis(monoethanolammonium) 3,6-endoxohexahydrophthalate; bis(diethanolammonium) 3,6-endoxohexahydrophthalate; bis(triethanolammonium) 3,6 - endoxohexahydrophthalate; bis(monopropanolammonium) 3,6-endoxohexahydrophthalate; diethylammonium ethanolpropanolammonium 3,6 - endoxohexahydrophthalate; sodium triethanolammonium 3,6-endoxohexahydrophthalate; potassium monoethanolammonium 3,6-endoxohexahydrophthalate; mono-tert-butylammonium monoethanolammonium 3,6-endoxohexahydrophthalate; bis-(ethylethanolammonium) 3,6-endoxohexahydrophthalate; bis(n-propyl-n - butylethanolammonium) 3,6 - endoxohexahydrophthalate; bis-(methyldiethanolammonium) 3,6-endoxohexahydrophthalate; monoethylammonium ethylisoamylethanolammonium 3,6 - endoxohexahydrophthalate; sodium isopropylethanolpropanolammonium 3,6-endoxohexahydrophthalate; potassium ethylethanolammonium 3,6-endoxohexahydrophthalate; dipropanolammonium ethylethanolammonium 3,6 - endoxohexahydrophthalate; and the calcium, barium, strontium, magnesium, cobalt, nickel, zinc, cadmium, mercury, copper, iron, and aluminum salts of 3,6-endoxohexahydrophthalic acid.

The invention was conceived as an economical and commercially feasible process for utilizing readily available chemicals and conventional equipment to prepare excellent yields of the desired salts in a satisfactory state of purity. This goal is achieved by sequentially following the steps indicated in the above equation, each step being conducted under favorable conditions as will be set forth herein.

It is indicated above that exo-cis-3,6-endoxo-1,2,3,6-tetrahydrophthalic anhydride is reacted with water to give exo-cis-3,6-endoxo-1,2,3,6-tetrahydrophthalic acid, and that this acid is then reacted with base in water solution to give a neutral salt of said acid. The base may be an inorganic base, an organic base, a mixed inorganic base, a mixed organic base, or a mixed inorganic-organic base. It is of course understood that the base is capable of forming one of the types of salts defined above.

However, in treating exo - cis-3,6-endoxo-1,2,3,6-tetrahydrophthalic anhydride with water, and subsequently with base, it is important to take recognition of the fact that both this anhydride and the corresponding exo-cis-3,6-endoxo-1,2,3,6-tetrahydrophthalic acid are unstable at temperatures somewhat above 75° C. However, decomposition is negligible at temperatures below about 75° C.

Therefore the treatment of the anhydride with water and subsequently with base is conducted in a temperature range which is conductive to maintaining the anhydride and acid in a stable condition, so that the desired salt formation can take place.

After the exo-cis-3,6-endoxo-1,2,3,6-tetrahydrophthalic acid has been converted to a water-soluble neutral salt of said acid, temperatures may be employed which are somewhat greater than those employed during conversion to the salt. It must not be inferred, however, that such salts are stable in all temperature ranges, for such is not the case.

Therefore it is a feature of the invention that the hydrogenation of the water-soluble neutral salts of 3,6-endoxo-1,2,3,6-tetrahydrophthalic acid be conducted in a temperature range which is conductive to maintaining said salts in a stable condition, so that they can react with hydrogen to form salts of the corresponding saturated acid, namely, 3,6-endoxo-hexahydrophthalic acid.

The neutral salts of exo-cis-3,6-endoxohexahydrophthalic acid are markedly more stable than are the intermediates from which they are derived. It is not known to what temperature levels they may be subjected without suffering decomposition, but for all practical purposes they may be regarded as stable.

It is a further feature of the invention that the catalyst employed be one which (a) is highly active in promoting hydrogenation of neutral salts of 3,6 - endoxo - 1,2,3,6 - tetrahydrophthalic acid in temperature ranges where said salts are substantially stable, thus permitting hydrogenation to proceed rapidly; (b) retains its activity over prolonged periods of time, even over the course of multiple hydrogenation runs, thus permitting economy and ease of operation; (c) is commercially available at a reasonable price, permitting still further economy; (d) does not rupture the endoxo linkage and thus give hydrogenated derivatives of phthalic acid. It has been discovered that nickel catalysts and cobalt catalysts meet these requirements particularly well.

Many modifications of nickel catalysts and cobalt catalysts are known to the art, and no extensive discussion of preparational methods is needed.

A particularly useful and well-known modification is the Raney type of catalyst. The general procedure for preparing such a catalyst is to treat a finely divided nickel-aluminum alloy or cobalt-aluminum alloy with aqueous caustic soda. This operation converts the aluminum into sodium aluminate, which is soluble, and renders the nickel (or cobalt) capable of adsorbing large quantities of hydrogen.

Another well-known modification is the nickel-on-kieselguhr (or other porous support) type of catalyst. The support is impregnated with a water-soluble nickel salt, and the resulting mass is treated with a reagent capable of precipitating the nickel in the form of its oxide, hydroxide, or carbonate. This mass is washed and dried, and finally, the nickel compound contained therein is reduced with hydrogen to metallic nickel.

It is of course recognized that other catalysts might be found which possess any one or possibly any two or even any three of the attributes mentioned above. However, a catalyst must possess all four attributes, if it is to afford reasonable economy and technical effectiveness.

It is well-known, for example, that certain of the noble metal catalysts have been used in effecting small-scale catalytic hydrogenations somewhat similar chemically to those hydrogenations disclosed herein. Such catalysts, however, are very expensive, and small losses that are likely to attend commercial operation become quite serious economically speaking. Moreover, noble metal catalysts often are subject to the vagaries of poisoning by traces of impurities which are present in the reaction mixture.

The present process provides a simple, direct, and economical method for the preparation of water-soluble neutral salts of exo-cis-3,6-endoxohexahydrophthalic acid starting with available and reasonably-priced intermediates. These intermediates are processed under temperature conditions sufficiently mild that they do not decompose to any significant degree. Unusual types of equipment are not required.

The catalysts of this invention not only are cheap and readily available, but their activity is such that hydrogenation proceeds very satisfactorily even under restricted temperature conditions. Moreover, they do not readily lose their activity, such as by poisoning for example, and thus they may be used over long periods of time.

The desired products, namely, water-soluble neutral salts of exo-cis-3,6-endoxohexahydrophthalic acid, are obtained in almost quantitative yields. They are obtainable in concentrated aqueous solution merely by simple separation from the catalyst, for instance by decantation and/or filtration. If for any reason the products are desired in more concentrated form, or as dry, free-flowing powders, this may be accomplished by evaporation of the concentrated aqueous solutions, for example.

In a preferred procedure for practicing the invention, exo-cis-3,6-endoxo - 1,2,3,6 - tetrahydrophthalic anhydride is slurried with water in a mixing tank. Water, ice, and a stoichiometric proportion of base to anhydride are mixed with the slurry. Addition of these materials is carried out in such a manner that the temperature of the mixture is kept below 75° C. and preferably below 40° C.

The concentrated solution of water-soluble neutral salt of exo-cis-3,6-endoxo-1,2,3,6-tetrahydrophthalic acid so obtained is transferred by suitable means, as for example by pumping, to equipment suitable for conducting catalytic hydrogenation under moderate pressure. Various types of equipment may be used, but stirring autoclaves adapted to the purpose have been found convenient. Such adaptation should of course include some efficient means of cooling.

A suitable quantity of any one of the preferred catalysts is now added to the autoclave. The latter is closed, stirring is commenced, and hydrogen is introduced into the autoclave until the pressure therein is say approximately 300 p. s. i. g., the particular pressure not being critical. Hydrogenation proceeds rapidly and exothermically, and additional hydrogen is introduced as needed to maintain a pressure of say the approximate order of magnitude already noted.

During said hydrogenation, the temperature of the reacting mass is preferably maintained below 100° C. and still more preferably below 50° C. The temperature should, of course, be high enough for hydrogenation to take place, and preferably is above 0° C. and still more preferably above 15° C. Thus a preferred range is from 0° C. to 100° C. and particularly from 15° C. to 50° C. The top permissible temperature in any case is that at which a large degree of decomposition of the starting salt takes place. In the case of the inorganic salts such as the disodium salt, for example, temperatures up to 125° C. may be employed, whereas in the case of organic salts such as the amine salts, or mixed inorganic-organic salts it is better not to exceed 100° C. in view of danger of substantial decomposition.

Owing to the exothermic nature of the reaction, it is frequently necessary to cool the reaction mass during at least some stages of the reaction, in order to hold the mass within the preferred temperature range.

Completion of the reaction is indicated when substantially no more hydrogen is being taken up by the reaction mass, as evidenced by a constant gauge reading. Several hours, say up to a maximum of about 5 or 6 hours, are required to complete the reaction. At this point it is advisable, to insure completeness of reaction, to continue stirring for a short time, say about ½ hour to 1 hour, at about the same pressure and temperature as before.

Stirring is then discontinued and the pressure is released from the autoclave. The system is allowed to stand for about ½ hour to permit the catalyst to settle out. The bulk of the concentrated aqueous solution of the water-soluble neutral salt of exo-cis-3,6-endoxohexahydrophthalic acid is removed from the autoclave by any means which does not agitate the solution, as for example by means of a decanting well pipe. A small portion of the solution is purposely not removed, in order that the catalyst will remain in place for the next hydrogenation run.

In actual practice it is difficult to remove the aqueous solution from the autoclave without carrying along a small amount of catalyst. For this reason it is advisable to add a small amount of fresh catalyst to the autoclave before proceeding with the next run. By operating in this manner, the economy in use of catalyst is noteworthy, as is demonstrated in one of the examples given below.

The immediate product as taken from the autoclave need only be filtered to render it suitable for packaging, storing, and merchandising. Or if desired, the immediate product may be further processed.

Preferred temperatures for conducting the hydrogenation have been indicated above. They are temperatures at which the water-soluble neutral salts of exo-cis-3,6-endoxo-1,2,3,6-tetrahydrophthalic acid are substantially stable and do not decompose. It should be pointed out that there is another reason for conducting this step of the process under these relatively mild temperature conditions. It has been found that the endoxo linkage which is bridged between carbon atoms 3 and 6 of the carbocyclic ring is stable at such temperatures. Should the endoxo linkage be ruptured, as might occur at substantially higher temperatures, it is obvious that undesirable side reactions would result. One such side reaction might well be hydrogenolysis, with attendant formation of derivatives of hexahydrophthalic acid.

The following examples provide illustrations of the practice of the invention in the preparation of water-soluble neutral salts of 3,6-endoxohexahydrophthalic acid.

*Example 1*

Fifty-seven pounds of water and 25 pounds of exo - cis - 3,6 - endoxo - 1,2,3,6 - tetrahydrophthalic anhydride were mixed together in a 50 gallon mixing tank. To the resulting slurry were added 47 pounds of ice and 37.5 pounds of 32% caustic soda solution. The addition was carried out slowly and with continuous mixing. By so doing, the temperature was maintained between 30° C. and 40° C.

The resulting concentrated aqueous solution of disodium exo-cis-3,6-endoxo-1,2,3,6-tetrahydrophthalate was pumped to a 25 gallon stirring autoclave fitted suitably for conducting catalytic hydrogenation.

To the aqueous solution in the autoclave was added 320 g. of Raney nickel catalyst and the autoclave was then closed and agitation was commenced. Hydrogen was introduced to a pressure of 300 p. s. i. g. As the reaction proceeded, heat was evolved and the autoclave was sprayed with cool water as needed. In this way the temperature was maintained between 30° C. and 40° C. throughout the reaction period, the average temperature being 36° C. Also as the reaction proceeded, the hydrogen consumed by reaction was compensated for by introduction of additional hydrogen as needed. In this way the pressure within the autoclave was maintained between 200 p. s. i. g. and 300 p. s. i. g. throughout the reaction period. The reaction mass stopped taking up hydrogen after 3¼ hours, and agitation was continued for an additional ½ hour.

Agitation was then discontinued and the pressure was released from the autoclave. The system was allowed to stand for ½ hour, during which time the catalyst settled to the bottom. 141 pounds of the aqueous solution was removed from the autoclave by means of a decanting well pipe, and the solution was then filtered. The remaining 25.5 pounds of solution was left in the autoclave together with the catalyst.

The filtered solution, which was clear, had a light straw color. It was shown by analysis to contain 20.3% of disodium exo-cis-3,6-endoxohexahydrophthalate.

Example 2

Starting with the autoclave left as at the end of Example 1, that is, containing 25.5 pounds of the aqueous solution of hydrogenated product and substantially all of the Raney nickel catalyst charged into it originally, a series of 45 additional runs was made.

In each run, the respective weights of exo-cis-3,6-endoxo-1,2,3,6-tetrahydrophthalic anhydride, water, ice, and 32% caustic soda solution were the same as those used in Example 1.

Over the series, small amounts of fresh Raney nickel catalyst were added as make-up. The aggregate amount of these additions was 1475 g., thus demonstrating economy of catalyst usage, particularly since most of the catalyst lost was removed mechanically with the product solution. Also over the series, other reaction conditions such as temperature, pressure, and time of reaction were maintained substantially the same as in Example 1.

At the end of each run except the last, the autoclave was partially discharged by the same decantation procedure used in Example 1. At the end of the last run, the autoclave was completely discharged by means of a well pipe leading to the bottom. The individual solutions were filtered and composited.

In this series of 45 runs, 1125 pounds of exo-cis-3,6-endoxo-1,2,3,6-tetrahydrophthalic anhydride was used. There was obtained 7414 pounds of clear, straw-colored filtrate containing 1502 pounds of disodium exo-cis-3,6-endoxohexahydrophthalate, as shown by analysis. This represents a yield of 96.5%, based on the anhydride.

Example 3

750 grams of exo-cis-3,6-endoxo-1,2,3,6-tetrahydrophthalic anhydride and 1620 grams of water were intimately mixed to form a slurry. To this slurry 1500 grams of ice and 1080 grams of 33% caustic soda solution were slowly added, the mixture being stirred continuously during the addition. The mixture was thus held at approximately room temperature.

The concentrated aqueous solution of disodium exo-cis-3,6-endoxo-1,2,3,6-tetrahydrophthalate thus obtained was transferred to a 2-gallon stirring autoclave suitably fitted for conducting catalytic hydrogenation.

37 grams of Raney cobalt catalyst was charged to the autoclave. The latter was then closed, stirring was begun, and hydrogen was introduced to a pressure of 300 p. s. i. g. Hydrogenation took place and the temperature increased, but at no time during the reaction was the temperature in excess of 31° C. The hydrogen consumed as the reaction proceeded was compensated for by introduction of more hydrogen, and the pressure inside the autoclave was thus maintained between 250 p. s. i. g. and 300 p. s. i. g. throughout the reaction period. After 6½ hours the reaction was complete, as evidenced by the fact that no more hydrogen was being absorbed.

Stirring was discontinued and the autoclave was vented. The reaction mass was removed, and was then filtered.

The filtrate, which weighed 4265 grams, was shown by analysis to contain 20.3% of disodium exo-cis-3,6-endoxohexahydrophthalate.

Example 4

Exo-cis-3,6-endoxo-1,2,3,6-tetrahydrophthalic anhydride (637 g., 3.84 moles) was placed in a 5-liter, 3-neck flask equipped with stirrer, thermometer, and dropping funnel. The flask was supported in an ice bath. Water (2000 cc.) was added to the flask, and a solution containing 506 g. of 85% potassium hydroxide (7.68 moles) dissolved in 1000 cc. of water was slowly dropped in from the funnel. The temperature was maintained between 10° C. and 20° C.

There was thus provided an aqueous solution of dipotassium exo-cis-3,6-endoxo-1,2,3,6-tetrahydrophthalate, which was transferred to a 2-gallon hydrogenation autoclave. Raney nickel catalyst (200 g.) was placed in the autoclave. Hydrogenation was carried out at room temperature, the maximum temperature during the reaction being 27° C., and at a maximum pressure of 400 p. s. i. g. until no further drop in pressure was noted. This required about ¾ hour.

The reaction mixture was taken from the autoclave and filtered twice to effect separation of catalyst from the solution. There was thus obtained a 24.2% aqueous solution of dipotassium exo-cis-3,6-endoxohexahydrophthalate.

Example 5

Exo-cis-3,6-endoxo-1,2,3,6-tetrahydrophthalic anhydride (761 g., 4.58 moles) was placed in a 5-liter, 3-neck flask equipped with stirrer, thermometer, and dropping funnel. The flask was supported in an ice bath. Water (2683 cc.) was added to the flask, and 28% aqueous ammonia (556 g., which is equivalent to 9.16 moles of NH₃) was slowly dropped in from the funnel. The temperature was maintained between 10° C. and 20° C.

There was thus provided an aqueous solution of diammonium exo-cis-3,6-endoxo-1,2,3,6-tetrahydrophthalate, which was transferred to a 2-gallon hydrogenation autoclave. Raney nickel catalyst (200 g.) was placed in the autoclave. Hydrogenation was carried out at room temperature, the maximum temperature during the reaction being 25° C., and at a maximum pressure of 400 p. s. i. g. until no further drop in pressure was noted. This required about ¾ hour.

The reaction mixture was taken from the autoclave and filtered twice to effect separation of catalyst from the solution. There was thus obtained a 25.2% aqueous solution of diammonium exo-cis-3,6-endoxohexahydrophthalate.

*Example 6*

Exo-cis-3 6-endoxo-1,2,3,6 - tetrahydrophthalic anhydride (430 g., 2.59 moles) was placed in a 5-liter, 3-neck flask equipped with stirrer, thermometer, and dropping funnel. The flask was supported in an ice bath. Water (3047 cc.) was added to the flask, and triethylamine (523 g., 5.18 moles) was slowly dropped in from the funnel. The temperature was maintained between 10° C. and 20° C.

There was thus provided an aqueous solution of bis(triethylammonium) exo-cis-3,6-endoxo-1,2,3,6-tetrahydrophthalate, which was transferred to a 2-gallon hydrogenation autoclave. Raney nickel catalyst (200 g.) was placed in the autoclave. Hydrogenation was carried out at room temperature, the maximum temperature during the reaction being 23° C., and at a maximum pressure of 400 p. s. i. g. until no further drop in pressure was noted. This required about ¾ hour.

The reaction mixture was taken from the autoclave and filtered twice to effect separation of catalyst from the solution. There was thus obtained a 25% aqueous solution of bis(triethylammonium) exo - cis - 3,6 - endoxohexahydrophthalate. When a portion of this solution was evaporated, the salt was obtained as a very viscous liquid.

*Example 7*

A 29.2% aqueous solution of exo-cis-3,6-endoxo-1,2,3,6-tetrahydrophthalic acid was prepared by dissolving exo-cis-3,6-endoxo-1,2,3,6-tetrahydrophthalic anhydride in the requisite amount of water. The solution, which weighed 1600 g. and contained 2.54 moles of exo-cis-3,6-endoxo-1,2,3,6-tetrahydrophthalic acid was neutralized with 371 g. (5.08 moles) of diethylamine. During the neutralization, the mixture was externally cooled to maintain its temperature at 40° C. or less. The resulting solution was treated with an additional 25 g. of diethylamine to insure a pH of at least 9, and was then diluted with water to a total weight of 3900 g.

The solution of bis(diethylammonium) exo-cis-3,6-endoxo-1,2,3,6-tetrahydrophthalate thus prepared was placed in a 2-gallon hydrogenation autoclave. Raney nickel (25 g.) was washed into the autoclave with 200 cc. of water. The resulting suspension was stirred and heated to 100° C. Hydrogen was then admitted to a pressure of 350 p. s. i. g. Hydrogenation occurred readily and was substantially completed in ¾ hour, at which time the drop in pressure had virtually ceased. This process was conducted at 98–100° C.

The reaction mixture was removed from the autoclave and was filtered to remove the catalyst. The solute in the filtrate thus obtained was preponderantly bis(diethylammonium) exo-cis-3,6-endoxohexahydrophthalate, but there was present a larger quantity of by-product than is obtained under lower temperature conditions.

Similar reactions carried out with each of triethylamine and triethanolamine, respectively, as the neutralizing base instead of diethylamine gave similar results.

Having more particularly described the invention, it is to be understood that this is by way of illustration and that modifications may be made within the scope of the claims without departing from the spirit of the invention. For example, it is to be understood that processing equipment of types other than those specifically mentioned may be used. During the hydrogenation it may at times be found more convenient to operate at pressures either lower or higher than those specifically mentioned herein. In fact, for reaction purposes pressure is not critical, pressure being used to speed up the reaction. It is also possible to use an entirely new lot of catalyst for each hydrogenation run, although it is uneconomic to do so. It is likewise possible upon completion of hydrogenation to filter the entire reaction mass, recovering the catalyst and recharging it to the reactor for the next run if desired. If desired, dispersions or suspensions may be employed instead of solutions. These variations as well as other modifications will occur to those who are skilled in the art upon becoming familiar herewith.

Accordingly, it is intended that the patent shall cover by suitable expression in the claims the features of patentable novelty which reside in the invention.

I claim:

1. A method for the production of a water-soluble neutral salt of 3,6-endoxohexahydrophthalic acid, which comprises subjecting the corresponding water-soluble neutral salt of 3,6-endoxo-1,2,3,6-tetrahyrophthalic acid to hydrogen pressure at a temperature below 125° C. in the presence of a catalyst selected from the group consisting of nickel and cobalt hydrogenation catalysts, while maintaining temperature conditions below the point at which a large degree of decomposition of said second-mentioned neutral salt takes place.

2. A method for the production of a water-soluble neutral salt of exo-cis-3,6-endoxohexahydrophthalic acid, which comprises subjecting the corresponding water-soluble neutral salt of exo-cis - 3,6 - endoxo - 1,2,3,6-tetrahydrophthalic acid to hydrogen pressure at a temperature below 100° C. in the presence of one of the group consisting of nickel hydrogenation catalyst and cobalt hydrogenation catalyst, and maintaining said reaction conditions for a time sufficient to cause hydrogenation of said second-mentioned neutral salt to take place to produce said first-mentioned neutral salt.

3. The method of claim 1 in which the first- and second-mentioned neutral salts are inorganic salts of the exo-cis isomers of the respective acids, and in which temperature conditions are maintained below 125° C.

4. The method of claim 1 in which the first- and second-mentioned neutral salts are organic salts of the exo-cis isomers of the respective acids, and in which temperature conditions are maintained below 100° C.

5. The method of claim 1 in which the salts of the respective acids are of the exo-cis form, and in which temperature conditions are maintained between approximately 0° C. and approximately 100° C.

6. The method of claim 5 in which the respective salts are alkali metal salts.

7. The method of claim 5 in which the respective salts are disodium salts.

8. The method of claim 5 in which the respective salts are diammonium salts.

9. The method of claim 5 in which the respective salts are bis(alkylammonium) salts.

10. The method of claim 5 in which the respective salts are bis(diethylammonium) salts.

11. The method of claim 5 in which the respective salts are bis(triethylammonium) salts.

12. The method of claim 5 in which the respective salts are bis(triethanolammonium) salts.

JOHN F. OLIN.

No references cited.